Jan. 13, 1931.　　　G. BERNERT　　　1,789,096
PNEUMATIC CONVEYER
Filed Aug. 2, 1924　　　2 Sheets-Sheet 1
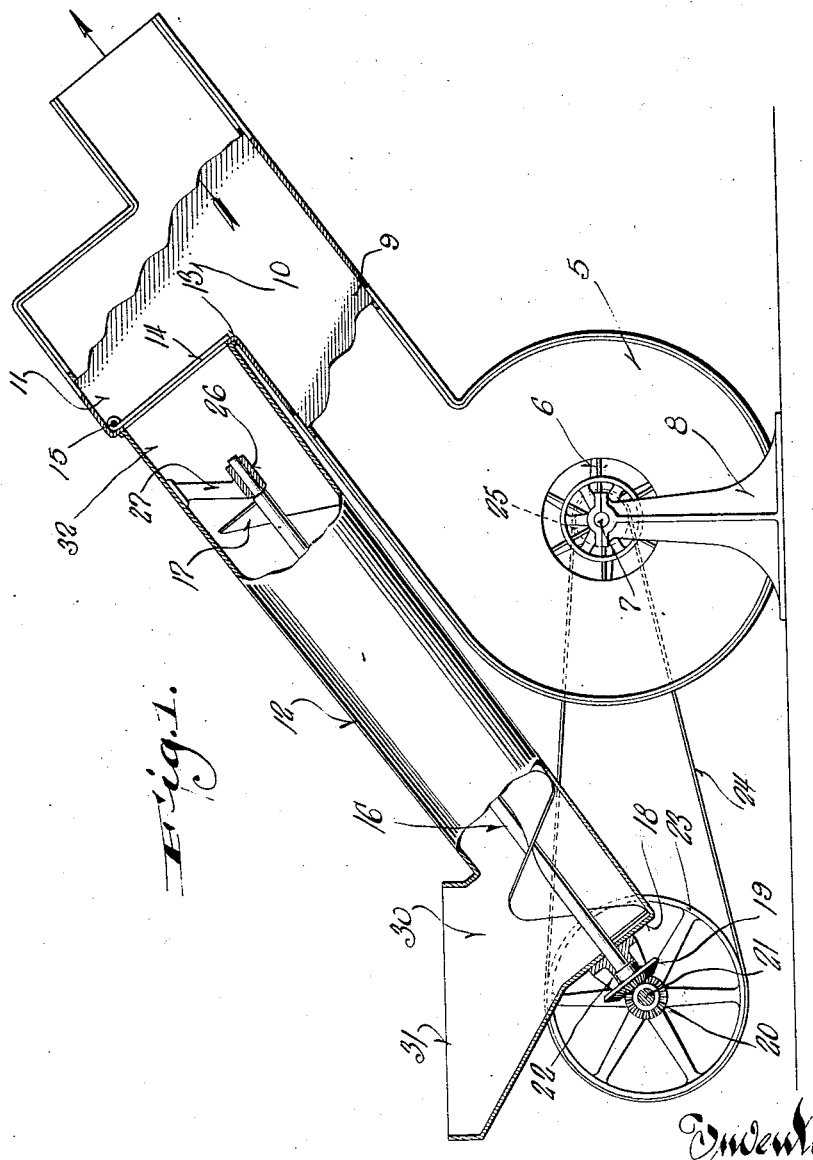

Jan. 13, 1931.  G. BERNERT  1,789,096
PNEUMATIC CONVEYER
Filed Aug. 2, 1924   2 Sheets-Sheet 2
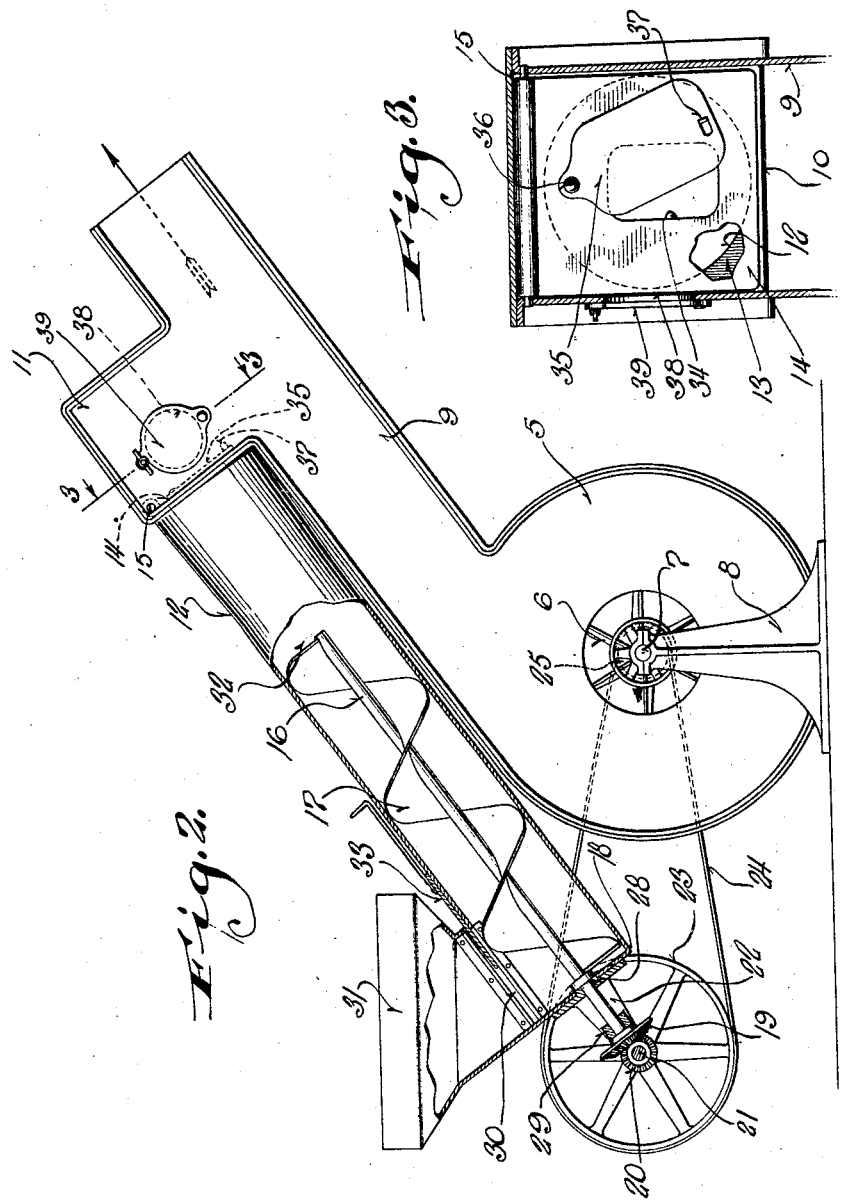
Inventor,
George Bernert
By Ira M. Jones.
Attorney Patented Jan. 13, 1931

1,789,096

UNITED STATES PATENT OFFICE

GEORGE BERNERT, OF MILWAUKEE, WISCONSIN, ASSIGNOR TO INDUSTRIAL & UTILITY CONVEYOR COMPANY, OF MILWAUKEE, WISCONSIN, A CORPORATION OF SOUTH DAKOTA

PNEUMATIC CONVEYER

Application filed August 2, 1924. Serial No. 729,791.

This invention relates to certain new and useful improvements in pneumatic conveyers and refers more particularly to a conveyer of that type having a conveying air duct and a conveyer casing communicating therewith and housing mechanical means for conveying the material to be handled therethrough to be discharged into the air duct to be carried therethrough by the conveying current of air therein.

One of the draw-backs to pneumatic conveyers is the back pressure which must be contended with in the mechanical conveyer casing by reason of its communication with the air duct, and this invention has as one of its objects the provision of a storage space interposed between the discharge end of the mechanical conveyer and the communication of the conveyer casing with the air duct which is normally filled with material during the operation of the apparatus to thus act as a protection against passage of the pressure current of air from the duct through the conveyer casing beyond the limits controlled by the valve by-pass.

Another object of this invention resides in the provision of a pneumatic conveyer having a storage space interposed between the discharge end of the mechanical conveyer and the communicating of the casing therefor with the air duct, a valve normally closing the outer discharge end of the storage space and adapted to swing open upon the material pressing thereagainst, whereby the opening of the valve is at all times in proportion to the feed of material through the conveyer casing.

It is another object of this invention to provide a pneumatic conveyer apparatus of the character described including a normally closed valve at the discharge end of the conveyer casing having an adjustable discharge opening through which the air may enter from the air duct to contact with the material being conveyed and remove chaff and other foreign matter and condition the same.

This invention has as another object the provision of a pneumatic conveyer apparatus having a discharge chamber in communication with the air duct and into which the conveyer casing discharges.

Another object of this invention resides in the provision of a pneumatic conveyer mechanism having a conveying air duct, and a conveyer casing of substantially cylindrical form arranged to discharge into a substantially rectangular discharge chamber communicating with the air duct to provide a shoulder forming a seat against which a valve member, hingedly mounted in the chamber, is normally engaged to prevent the conveying current of air from backing into the conveyer casing through the discharge chamber.

A further object of this invention resides in the provision of an apparatus of the character described having a discharge chamber normally communicating with the air duct and normally closed from the conveyer casing by a valve having an adjustable opening therein, the discharge chamber having a hand hole therein through which the opening in the valve may be readily regulated.

Where a screw or other type of rotary conveyer is employed for feeding the material from the hopper to the conveyer casing through air duct, strings, straws, or the like become entwined about the upper end of the shaft where it is passed outwardly through the upper end of the casing or about the upper thrust bearing where it has been driven from the bottom as illustrated in Letters Patent No. 1,200,699, granted October 10, 1916 and, therefore, this invention has as a further object the provision of a screw conveyer which is driven from the bottom and the upper end of which is free to float in the conveyer thus offering no obstruction to the passage of material.

A further object of this invention resides in the provision of a pneumatic conveyer of the character described having a screw conveyer for feeding material from the hopper through the conveyer casing to the air duct which has its lower end substantially directly driven from the blower fan to thus produce an efficient and simple drive.

With some types of material, it has been found that there is a tendency to pack or jam as it is fed through the conveyer casing, requiring an excessive amount of energy to drive the conveyer and, therefore, this invention has as a further object the provision of a conveyer casing, the upper end of which is taperingly enlarged to permit the separation of the material as it is fed upwardly therethrough to prevent its packing or jamming.

This invention has as a further object the provision of a pneumatic conveyer in which the casing for housing the mechanical conveyer and the air duct are parallel, the upper end of the conveyer casing being so connected with the air duct as to discharge the material therefrom transversely into the conveying current of air to prevent the accumulation of the material in the blower fan casing.

And a still further object of this invention resides in the provision of a hopper from which the material to be conveyed is fed to the conveyer casing through a gate to regulate the feed of the material through the casing.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which:

Figure 1 is a side view, with parts broken away and in section, illustrating a pneumatic conveying apparatus embodying my invention;

Figure 2 is a view similar to Figure 1 of a slightly modified form of pneumatic conveyer mechanism, and Figure 3 is an enlarged fragmentary view taken transversely through the discharge chamber of that form of my invention illustrated in Figure 2 on the plane of the line 3—3.

Referring now more particularly to the accompanying drawings, in which like numerals designate like parts throughout the several views, the numeral 5 designates a fan casing having a fan or blower 6 therein, the shaft 7 of which is journaled in standards or supports 8, secured adjacent the sides of the fan casing.

A conveying air duct or trunk 9 has its lower end in communication with the fan casing and, in the present embodiment, projects upwardly therefrom and has an opening 10 in its top wall communicating with a discharge chamber 11 forming a substantial continuation of a mechanical conveyer casing 12. The conveyer casing 12, in the present embodiment, is of substantially cylindrical form and approximately parallels the trunk or air duct 9 and the discharge chamber 11 is of substantially rectangular form, its side walls being preferably formed by extending the sides of the air duct. A shoulder 13 is formed at the junction between the casing 12 and chamber 11 to provide a seat for a valve 14 which normally engages the same to close the upper end of the casing from the discharge chamber. The valve 14 has its upper end hingedly mounted, as at 15, and is normally urged by gravity to its closing position engaging the seat 13 to prevent the pressure current of air in the duct 9 from passing into the conveyer casing, but, at the same time, permitting the valve to freely swing open upon pressure of material fed through the conveyer casing.

Mounted in the conveyer casing 12 as a shaft 16 on which is formed a screw conveyer 17, the shaft 16 passing through the bottom wall 18 of the conveyer casing and having a bevel or miter gear 19 fixed thereon which meshes with the pinion gear 20 fixed to a counter-shaft 21. The counter-shaft is journaled in bearings 22 carried by the rear wall of the casing and has a drive pulley 23 fixed thereto which is connected with the fan shaft by a belt 24 trained about a pulley 25 on the fan shaft.

In Figure 1 the shaft 16, is illustrated as having its upper end journaled in a relatively small bearing 26 carried by a bracket 27 secured to the casing wall. When the bearing 26 is employed it is of the smallest possible size, as is the arm 27, which serves primarily to center the shaft and reduce, as much as possible, resistance to the passage of material through the conveyer casing.

In that form of my invention illustrated in Figure 2, the shaft 16 has its upper end free and its outer end is journaled in a bearing plate 28 fixed to the wall 18 and in a bearing 29 carried by the brackets 22 to thus insure the steadying of the shaft in the casing. This form of my invention offers no resistance to the passage of material through the conveyer casing and eliminates all possibiilty of strings, straws and other foreign matter becoming entangled therewith.

The lower end of the conveyer casing has its top wall provided with an opening 30 with which a hopper 31 communicates, the material to be conveyed being deposited in the hopper and then discharged into the conveyer casing through the opening 30 and picked up by the screw conveyer 16. The upper end of the screw 17 terminates inwardly of the upper valved end of the casing to provide a storage space 32 in which the material fed upwardly through the conveyer accumulates. After the storage space has been filled, the continued feeding of material through the casing 12 opens valve 14 in proportion to the feed of the conveyer to thus discharge the material into the air duct 9 through the discharge chamber 11. Should the material be of a character such as to pack and cling together, the material, instead of dropping directly into the air duct over the lower edge of the opening 10, is forced into the chamber 11 until, by reason of its length, it buckles and is discharged as will be evident.

In that form of my invention illustrated in Figure 2, the opening 30 of the hopper 31 is variable by a slide gate 33 which is operable to regulate the area of the opening 30 and consequently the rate at which the material is fed the conveyer 17. The valve 14 is also provided with an opening or port 34 therein which is adjustable by a door or flap 35 which is connected therewith, as at 36, and has a projection 37 on its free end to facilitate movement thereof over the valve port.

The door or flap 35 is normally frictionally retained in any position and is moved to open position when it is desired to permit a portion of the conveying current of air from the duct 9 to enter the conveyor casing and contact with the material. This contact with the material on the part of the portion of the conveying current of air results in a conditioning of the material, tending to remove moisture, chaff and dust. The air entering the conveyer casing may be discharged therefrom either at the hopper 31 or through other means provided at any point in the conveyer casing. The flap or cover 35 may be readily adjusted through a hand hole 38 in the side of the chamber 11 which is normally closed by a plate or door 39.

The provision of the storage space 32 between the discharge end of the screw conveyer and the communication of the conveyer casing with the air duct by means of the chamber 11 restricts or eliminates the occurrence of back pressure in the conveyer casing except when the door or flap 35 is moved to open position, thus providing an economy in operation. The storage space also results in the even or equal distribution of the material being conveyed into the conveying current of air eliminating the occurrence of unequal loads such as is caused when the volume of material discharged into the air duct varies.

As various types of material have a tendancy to pack or jam as they are fed through the casing 12, the casing is preferably taperingly enlarged toward its discharge end to thus permit the material to spread or separate. In that form of my invention illustrated in Figure 1, the casing 12 is tapered from a point adjacent the hopper 31 to its upper discharge end and in the modification illustrated in Figure 2, it is tapered for only the approximate length of the space 32.

From the foregoing description taken in connection with the accompanying drawings, it will be readily apparent to those skilled in the art to which an invention of this character appertains that I provide a pneumatic conveying mechanism in which the occurrence of back pressure in the conveyer casing is eliminated, the material is discharged into the air duct angularly with respect to the conveying current of air to thus insure its being carried thereby and not dropped downwardly into the fan casing, and one having an obliquely extended air duct into which the material is discharged to intersect the conveying current of air at an angle.

What I claim as my invention is:

1. In a pneumatic conveyer apparatus having a blower fan, a conveying air duct leading from the fan and in which a conveying current of air is created by the fan, a mechanical conveyer casing arranged adjacent the air duct and a mechanical conveyer mounted in the conveyer casing for conveying material longitudinally therethrough, a chamber interposed between the discharge end of the casing and the air duct and through which material conveyed through the casing passes to be discharged into the air duct, a storage space in the upper discharge end of the conveyer casing in which the material conveyed through the casing accumulates before entering said chamber, a valve normally closing the storage space from said chamber and past which material is fed in proportion to the feed of material through the conveyer casing, and a port in said valve through which a portion of the conveying current of air enters to contact with the material conveyed through the conveyer casing.

2. In a pneumatic conveyer apparatus having a blower fan, a conveying air duct leading from the fan, a mechanical conveyer casing arranged adjacent the air duct and a mechanical conveyer mounted in the conveyer casing for conveying material longitudinally therethrough, a chamber interposed between the discharge end of the casing and the air duct and through which material conveyed through the casing passes to be discharged into the air duct, a storage space in the upper discharge end of the conveyer casing in which the material conveyed through the casing accumulates before entering said chamber, a valve normally closing the storage space from said chamber and past which material is fed in proportion to the feed of material through the conveyer casing, and an adjustable port in said valve.

3. In a pneumatic conveyer apparatus having a blower fan, a conveying air duct leading from the fan, a mechanical conveyer casing arranged adjacent the air duct and a mechanical conveyer mounted in the conveyer casing for conveying material longitudinally therethrough, a chamber interposed between the discharge end of the casing and the air duct and through which material conveyed through the casing passes to be discharged into the air duct, a storage space in the upper discharge end of the conveyer casing in which the material conveyed through the casing accumulates before entering said chamber, a valve normally closing the storage space from said chamber and past which material is fed in proportion to the feed of material through the conveyer casing, an adjustable port in said valve, and a handhole in one wall of said chamber to facilitate the adjustment of said valve port.

4. In a pneumatic conveying apparatus having a conveying air duct, a blower fan connected with the duct and operable to create a conveying current of air therein, a mechanical conveyer casing arranged to discharge into the air duct and mechanical means for feeding material through said conveyer casing to the air duct, means normally closing the mechanical conveyer casing from the air duct to prevent the occurrence of back pressure therein from the air duct, and means operable to permit a portion of the conveying current of air to enter the mechanical conveyer casing and contact with the material fed therethrough to condition the same.

5. In a pneumatic conveying apparatus having a conveying air duct, a blower fan connected with the duct and operable to create a conveying current of air therein, a mechanical conveyer casing arranged to discharge into the air duct and mechanical means for feeding material through said conveyer casing to the air duct, means normally closing the mechanical conveyer casing from the air duct to prevent the occurrence of back pressure therein from the air duct, and adjustable means operable to permit a portion of the conveying current of air to enter the mechanical conveyer casing and contact with the material fed therethrough to condition the same.

In testimony whereof I affix my signature.

GEORGE BERNERT.